United States Patent
Möller et al.

(10) Patent No.: US 6,705,348 B2
(45) Date of Patent: Mar. 16, 2004

(54) CHECK VALVE

(75) Inventors: Heribert Möller, Sachsen (DE); Péter Schweizer, Grafenberg (DE)

(73) Assignees: MAN Nutzfahrzeuge AG (DE); Elring Klinger GmbH (DE)

( * ) Notice: Subject to any disclaimer, the term of this patent is extended or adjusted under 35 U.S.C. 154(b) by 88 days.

(21) Appl. No.: 10/002,093

(22) Filed: Nov. 15, 2001

(65) Prior Publication Data

US 2002/0056480 A1 May 16, 2002

(30) Foreign Application Priority Data

Nov. 15, 2000 (DE) .......................... 100 56 690

(51) Int. Cl.$^7$ .............................................. F16K 15/16
(52) U.S. Cl. .................................... 137/856; 137/855
(58) Field of Search ....................... 137/856, 855, 137/857, 858; 123/568.18; 60/605.2; 417/569, 571

(56) References Cited

U.S. PATENT DOCUMENTS

| 2,065,062 | A | * | 12/1936 | Dugelay | 137/512 |
|---|---|---|---|---|---|
| 5,213,125 | A | * | 5/1993 | Leu | 137/856 |
| 5,327,932 | A | * | 7/1994 | Rozek | 137/856 |
| 5,632,609 | A | * | 5/1997 | Hashimoto | 417/571 |
| 5,937,834 | A | * | 8/1999 | Oto | 123/568.18 |
| 6,174,147 | B1 | * | 1/2001 | Tarutani et al. | 137/856 |

FOREIGN PATENT DOCUMENTS

| FR | 2578943 | * | 9/1986 |
|---|---|---|---|
| GB | 1 44 708 | * | 8/1976 |
| GB | 1 489 296 | * | 10/1977 |

* cited by examiner

*Primary Examiner*—David A. Scherbel
*Assistant Examiner*—Ramesh Krishnamurthy
(74) *Attorney, Agent, or Firm*—R W Becker & Associates; R W Becker

(57) ABSTRACT

A check valve is provided and has a housing having inlet and outlet openings and comprising two essentially planar plate portions. A thin steel plate that acts as a valve is disposed between the plate portions. Under the effective pressure, the valve opens in one direction and blocks flow in the opposite direction. The valve has at least one valve tongue, and the plate portions in the valve are fixedly connected together. One of the plate portions is associated with the discharge zone and in the vicinity of the valve tongue is provided with at least one arched portion for limiting opening of the valve tongue. The other plate portion has bores through which the exhaust gas can enter under overpressure.

4 Claims, 2 Drawing Sheets

CHECK VALVE

BACKGROUND OF THE INVENTION

The present invention relates to a check or non-return valve having a housing with inlet and outlet openings, and a valve that under the effect of pressure opens in one direction yet blocks flow in the opposite direction, with opening of the valve being limited by an abutment.

The purpose of check valves is to allow a medium to pass in only one direction, while stopping flow in the opposite direction. One field of application for check valves is the return or recycling of exhaust gas utilizing exhaust gas pressure peaks. The valve of heretofore known devices opens under overpressure against the return force of a spring or the like. The valve closes as the overpressure drops and blocks the return flow of the medium.

Check valves are relatively expensive, and when used with mass-produced items, such as internal combustion engines, the costs therefor are not very acceptable.

It is therefore an object of the present invention to provide check valves having minimal manufacturing costs.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The check valve of the present invention is characterized primarily in that the housing comprises two essentially planar plate portions between which is inserted a thin steel sheet that acts as a valve; this valve is provided with at least one valve tongue. The plate portions and the valve are fixedly connected together, with a rim portion of the plate portions forming a sealing means. That plate portion that is associated with the discharge zone is provided in the vicinity of the valve tongue with at least one arched portion such that the latter functions as an abutment for the valve tongue.

The inventive construction requires minimal costs with respect to manufacture and material. In addition, the overall size is also reduced to a minimum. When using the inventive check valves for the return of exhaust gas in internal combustion engines, the overall size is frequently of critical significance with regard to practical applicability.

Further specific features of the present invention will be described in detail subsequently.

DESCRIPTION OF PREFERRED EMBODIMENTS

Figure 1:
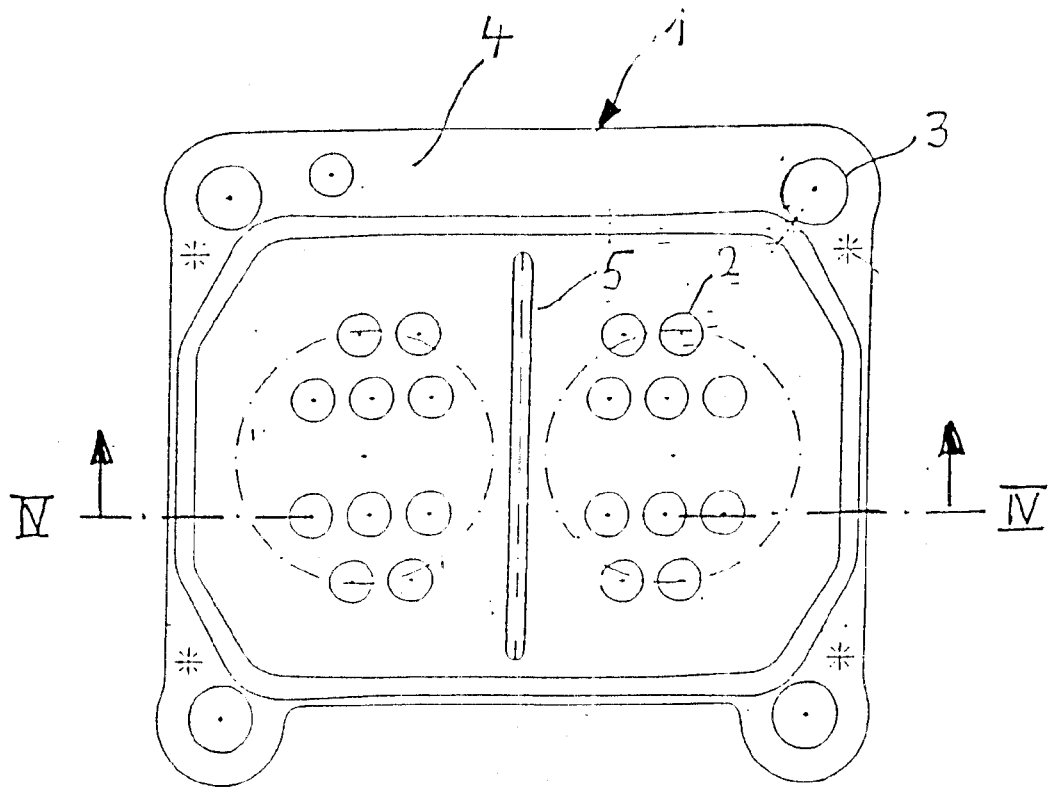
FIG. 1 is a view from the pressure side, in other words viewed in the direction of forward flow, of one exemplary embodiment of an inventive check valve.
Figure 2:
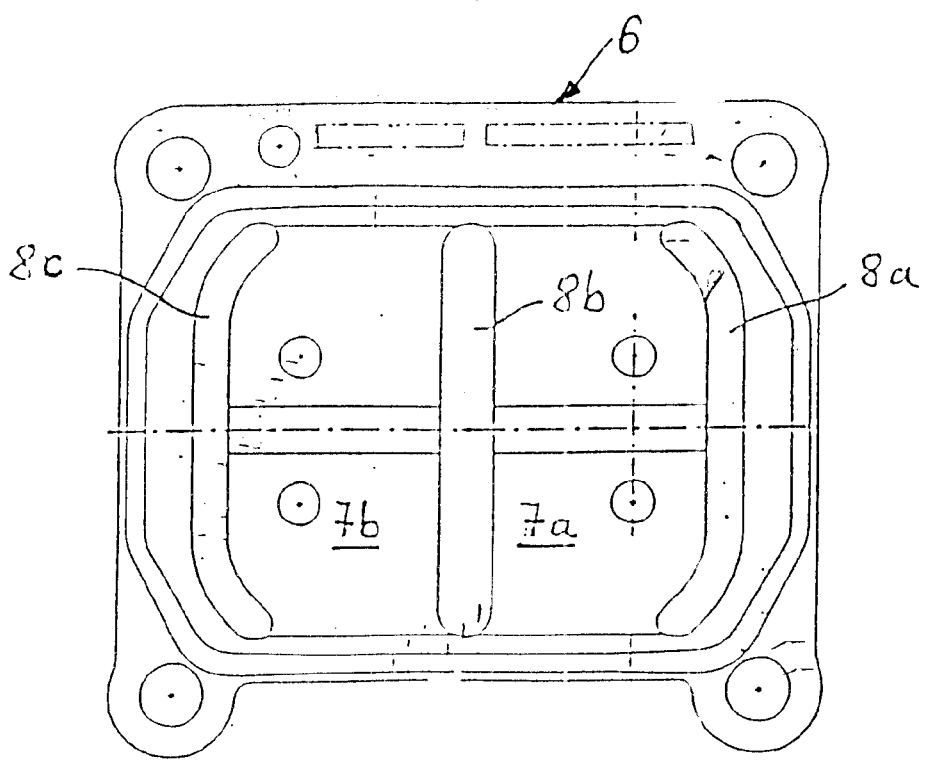
FIG. 2 is a view from a direction counter to the forward direction of flow.
Figure 3:
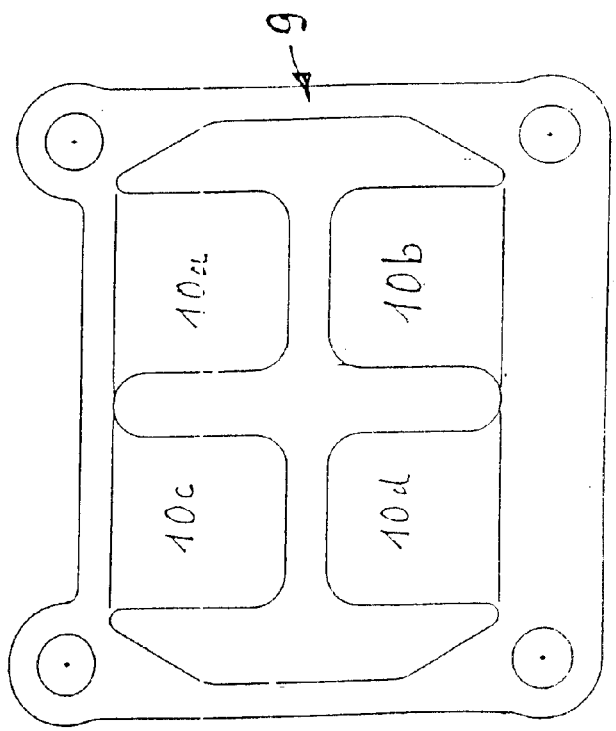
FIG. 3 is a view of the valve, which is formed from a steel sheet and which is inserted between the plate portions illustrated in FIGS. 1 and 2.
Figure 4:
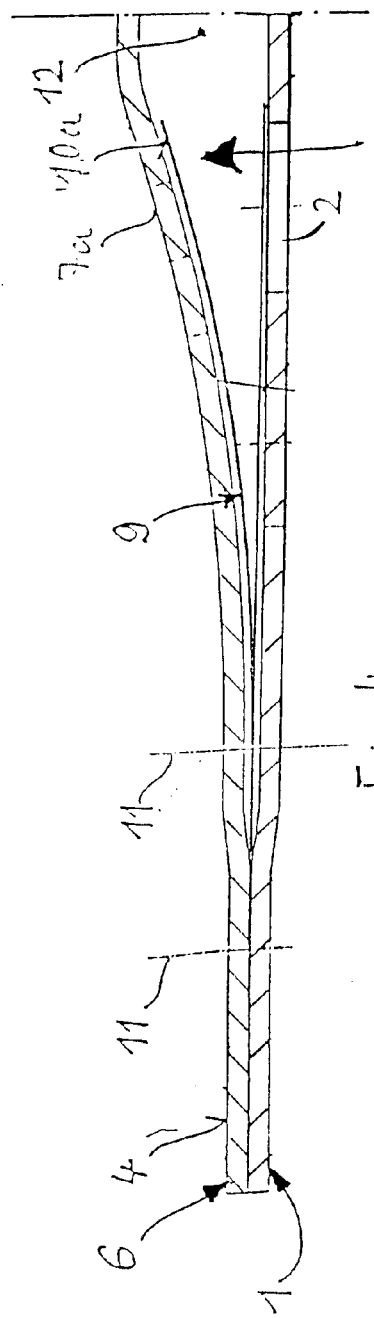
FIG. 4 is a view taken along the line IV—IV in FIG. 1 through the assembled check valve.

Referring now to the drawings in detail, the inventive check or non-return valve results from the assembly of the individual components 1,6 and 9 shown in FIGS. 1 to 3. FIG. 4 shows the assembled check valve.

FIG. 1 illustrates a first sheet metal or plate portion 1, which forms the pressure side inlet of the check valve. Under the effect of overpressure, the medium can flow in through the bores 2 in the direction of the plane of the drawing. The bores 3 that are disposed in the corners of the plate portion 1 serve, after the assembly, for the clamping securement between the conduit connector flanges. The plate portion 1 is essentially planar, so that the circumferential rim portion 4 in the installed state at the same time forms the sealing surface. The bead 5 illustrated in this embodiment serves, when being used for the return of exhaust gas in multi-cylinder engines, for the separation of the exhaust gas flows.

FIG. 2 shows a second sheet metal or plate portion 6, which is illustrated from the discharge side, i.e. is seen in the blocking direction. The border of the plate portion 6 is aligned with the plate portion 1. In order to have an abutment for the valve tongues 10a–10d (see FIG. 3), two bulged or arched portions 7a,7b are provided, the function and configuration of which are evident from FIG. 4. For use in engines having an exhaust gas flow, a single arched portion 7a and two valve tongues 10a,10b are sufficient. The discharge of the medium can be effected via longitudinal or elongated slots 8a–8c, which are disposed in the plate portion 6.

FIG. 3 shows the actual valve 9, which is comprised of a thin, elastic steel plate. The border is again aligned with the plate portions 1 and 6. In the illustrated embodiment, the valve 9 has four valve tongues 10a–10d, which open under the effect of overpressure, as will be explained in detail subsequently with reference to FIG. 4.

FIG. 4 is a cross-sectional view taken along the line IV—IV in FIG. 1. Since complete symmetry exists, one half only is illustrated. The assembly of the check valve is effected by layering the plate portions 1,6 upon one another, whereby the valve 9 is inserted between the plate portions 1 and 6. To secure the portions 1,6 and 9, spot welds 11 are performed that are distributed over the peripheral surface 4 (FIG. 1). If the check-valve is acted upon with overpressure in the direction indicated by the arrow, then my means of the bores 2 that are disposed in the plate portion 1, the valve tongue, for example, 10a, is raised until it comes to rest against the arched portion 7a. In FIG. 2 this arched portion 7a is illustrated in elevation. The same applies to the valve tongues 10b to 10d, which come to rest against the arched portions 7a,7b.

The medium, for example exhaust gas, can now be discharged via the bores 2 into the chamber 12 between the plate portion 1 and the arched portion 7a and into the elongated slots 8a,8b (FIG. 2) and is conveyed to the air charge line.

It is to be understood that the exemplary description for the valve tongue 10a also applies for the symmetrically embodied valve tongues 10b, 10c, and 10d.

The specification incorporates by reference the disclosure of German priority document 100 56 691.1 of Nov. 15, 2000.

The present invention is, of course, in no way restricted to the specific disclosure of the specification and drawings, but also encompasses any modifications within the scope of the appended claims.

We claim:

1. A check valve comprising:

a housing having inlet and outlet openings and comprising two essentially planar plate portions; and a thin steel plate that acts as a valve and is disposed between said plate portions, wherein under the effect of pressure, said steel plate opens in one direction and blocks flow in an opposite direction, wherein said steel plate is provided with at least one valve tongue, wherein said plate portions and said steel plate are fixedly connected together, wherein a rim portion of said plate portions forms a sealing means, and wherein one of said plate portions is associated with a discharge zone and in the vicinity of said at least one valve tongue is provided with at least one arched portion such that said arched portion functions as an abutment for said at least one valve tongue, wherein said at least one arched portion serves as said outlet openings, and wherein said at least one arched portion is disposed between elongated slots in said one of said plate portions.

2. A check valve according to claim 1, wherein said plate portions are fixedly interconnected by spot welds.

3. A check valve according to claim 2, wherein said valve with its at least one valve tongue is comprised of thin steel plate.

4. A check valve according to claim 3, wherein the other one of said plate portions is adapted to be on a pressure side and is provided with bores to form said inlet openings.

* * * * *